May 28, 1935. E. T. OLSON 2,003,278
PREPARATION OF ACTIVATED CARBON
Filed Aug. 28, 1933
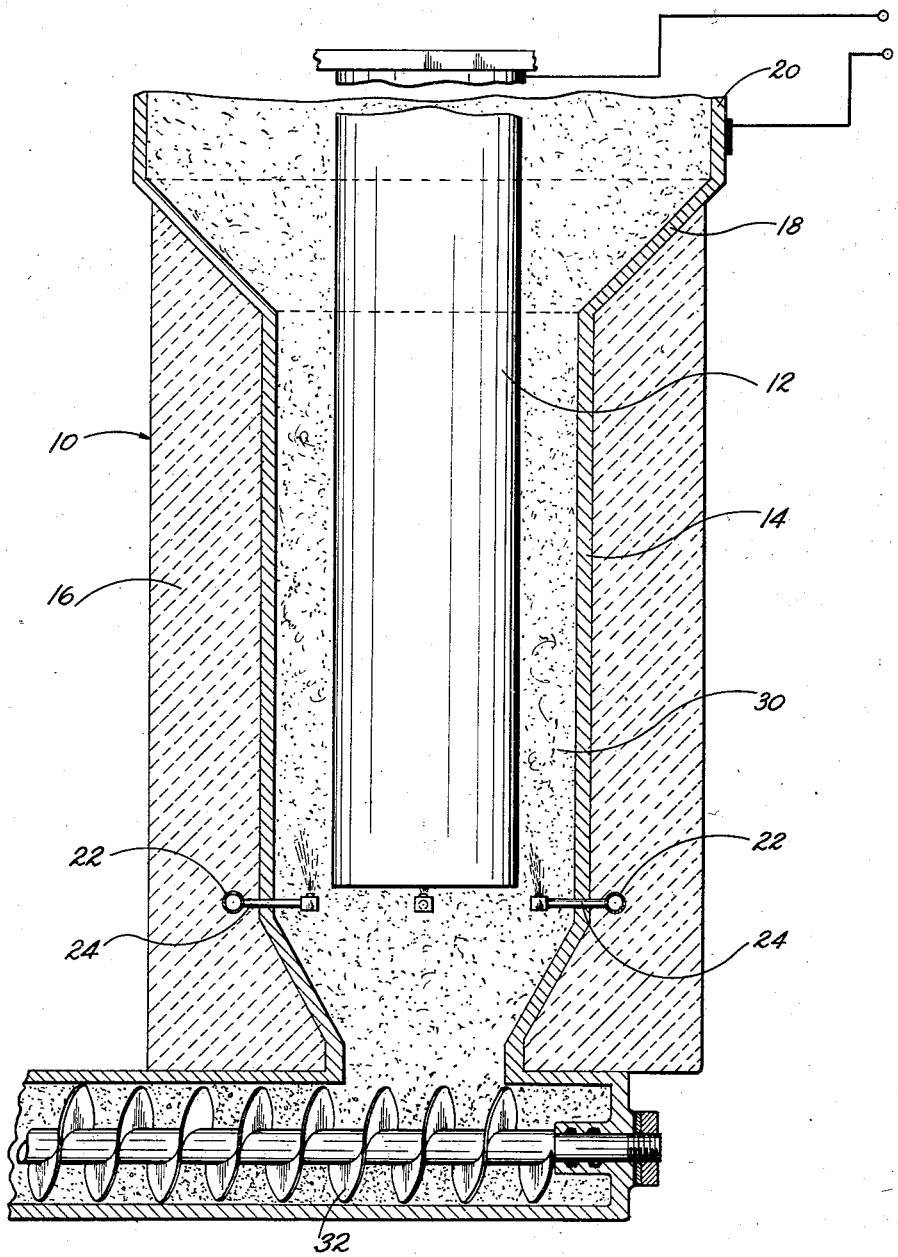
Inventor
EDGAR T. OLSON
By Richey & Watts
Attorneys Patented May 28, 1935

2,003,278

UNITED STATES PATENT OFFICE 2,003,278

PREPARATION OF ACTIVATED CARBON

Edgar T. Olson, New York, N. Y., assignor to The Cleveland Cliffs Iron Company, Cleveland, Ohio, a corporation of Ohio Application August 28, 1933, Serial No. 687,063

12 Claims. (Cl. 252—3)

This invention relates to a process for producing activated carbon employed commercially in purifying, decolorizing and filtering operations and the invention more particularly relates to a commercial method of manufacturing highly activated wood charcoal for the aforementioned purposes.

Heretofore activated carbons commercially used for filtering, purifying and other similar operations were for the most part made from finely divided carbon obtained from powdered coal such as lignite or from the carbonaceous vegetable matter forming the charred remnants obtained from wood pulp digesting liquors. These and various other forms of carbon, particularly after activation, have inherent properties which prevent their successful use for many purposes. For example, their ash and glycerine soluble content is too high and their absorption and purifying characteristics are too low. Moreover they are in many cases, too powdery or finely divided to be retained by ordinary filters and their capacity to be reactivated after use is negligible.

Prior to the present invention the commercial manufacture of activated carbon and particularly activated wood charcoal has been slow and expensive as the carbon is generally manufactured by a multi-stage operation or by a plurality of similar but repeated treating and activating operations.

Carbon has also heretofore been activated by a chemical operation as by treating with zinc chloride, calcium acetate, sodium carbonate, phosphoric acid or the like. However, these chemical treating operations while fairly satisfactory in the production of activated carbon from lignite or residues of pulp digesting liquors, have proven unsatisfactory in activating wood charcoal because they break down the cellular structure of the wood thereby interfering with its proper activation and at the same time destroying the advantages of the cellular wood structure as hereinafter discussed.

Moreover, in activating processes now being followed in general practice, expensive apparatus is ordinarily required for producing the activated carbon and the known processes are slow and difficult to control.

It is the purpose of the present invention to avoid the difficulties of prior known methods of producing activated carbon and particularly wood charcoal and moreover to provide a commercially feasible process for producing highly activated wood charcoal of a new and striking character which possesses qualities heretofore not obtained in activated wood charcoal. The new and improved charcoal forms the subject matter of my copending application Serial No. 683,380, filed Aug. 2, 1933.

The single figure in the drawing illustrates one form of apparatus for carrying out the process of the present invention.

In practicing the invention any suitable wood such as beech, birch, hard pine, maple or oak can be carbonized to form charcoal in any of the usual and well known manners but preferably at temperatures below 1000° F. The wood selected should not be too crumbly or soft to survive the carbonizing and activating operations so that the original cell structure of the wood will be retained in the activated charcoal.

After the wood has been changed to charcoal it is preferably granulated and then graded as by passing through a screen having about four meshes to the inch. The invention, however, contemplates employing charcoal granules or lumps of various sizes which may range well above and below the aforementioned size. There appears to be a definite relation between the size of the granules and the area of the treating space particularly when the granules are resistance heated by electric current to produce activation. This relation might be stated briefly that changes in the treating area are proportional to the square of the volume of each granule as hereafter more fully discussed. After the grading operation the granules are treated in any suitable manner to remove the dust therefrom as there is some danger of explosion as well as a possibility of burning the electrodes if the charcoal is activated at high temperatures with the dust still contained thereon.

The activating operation is preferably performed in a substantially air tight electric furnace wherein the charcoal granules are passed between electrodes with the current flowing through the granules acting to heat the granules due to their inherent resistance. The voltage and amperage of the electric current are controlled to heat the carbon granules to very high temperatures generally in the neighborhood of 3000° to 3300° F. This may be accomplished by an automatic transformer in which the current supplied thereto is automatically increased when the furnace temperature goes below 3000° F. and in which the current is automatically decreased when the furnace temperature goes above 3300° F. While the charcoal is being treated to the temperatures set forth above it is simultaneously subjected to the action of steam which is ordinarily passed into the charcoal by jets placed between the electrodes, preferably so that the flow of steam is opposite to the movement of the charcoal.

Treatment at the specified high temperatures causes all volatiles to be quite positively removed from the charcoal. At the same time the various controlling factors such as the amount of steam, the feed or travel of the charcoal, the size of the granules, the treating area, the temperature and the electric voltage and amperage are so related and controlled that a new highly activated charcoal is produced. For example, the amount of steam passed into the activating chamber has a very definite relation to the temperature inasmuch as it tends to lower the temperature. The size of the treating space and the area of the electrodes must be correlated with the size of the charcoal granules and the speed with which the material is passed thru the furnace. Again the electric current must be varied and adjusted with the remaining variables to obtain the desired results. As an illustration of the relationship of these variables it has been found that with charcoal granules which are graded thru about a 4 mesh screen the electrodes in the electric furnace should be separated from 2 to 10 inches when alternating current of about 500 volts at 30 amperes controlled as stated above is employed altho current ranging well above and below the stated quantity can be used. Under these conditions the charcoal is generally moved thru the furnace in a substantially continuous manner at speeds which ordinarily vary from ½" to 12" per hour. The amount of steam used, as stated above, serves to assist in determining the temperature and also functions in an activating capacity. With the other variables within the ranges stated above, from 1# to 5# of steam is used per hour. The various factors can be correlated as described so that from 250# to over a 1000# of highly activated charcoal can be produced in 24 hours by a substantially continuous method.

The process of the present invention can be followed with a number of different apparatuses, however, one form of apparatus for following the present method is shown in the drawing wherein the numeral 10 indicates generally an electric furnace having an inner electrode 12 and an outer electrode 14 with a heat insulating cover 16. The top of the furnace is provided with a hopper 18 into which a conduit 20 extends whereby the material to be treated can be introduced between the electrodes.

Suitable means are provided ordinarily at the bottom of the furnace for introducing steam into the body of the material being treated. These means may comprise a circular header pipe 22 which extends around the bottom of the furnace and which is provided with a number of independent jets 24 which are adapted to discharge steam upwardly through the material approximately mid-way between the inner electrode 12 and the outer electrode 14.

The numeral 30 indicates the material being treated in the furnace and ordinarily a gravity feed only is provided for passing the material through the furnace. The gravity feed can be controlled through the agency of suitable conveyor means such as the screw conveyor 32 placed at the bottom of the furnace which is adapted to conduct the material away from the furnace. Similar screw feed or conveyor means may be employed at the top of the furnace to feed the material thereto. It will be understood that the furnace is air-tight with the charging and discharging openings thereof being sealed off by the charcoal itself or by other additional means if this is found necessary under certain conditions.

In the form of the apparatus shown the furnace is approximately three feet high with the central electrode 12 being about one foot in diameter. A space of approximately four inches is provided between the inner electrode 12 and the outer electrode 14 which makes the internal diameter of the furnace in the neighborhood of twenty inches.

In activating wood charcoal in the apparatus described herein a typical process consists in passing approximately 500 pounds of granulated dust free charcoal which has been graded by about a No. 4 screen, through the furnace in 24 hours. The rate of feed of the material thru the furnace may be varied to comply with the remaining variables, however, it is generally in the neighborhood of one and one half inches per hour. The electric current employed is alternating current and is approximately 500 volts at 30 amperes. The amount of steam injected through the nozzles 24 may be in the neighborhood from 1 to 2 pounds per hour. The relation of parts is such and the particular manner of feeding and treating is controlled so that the charcoal is heated between about 3000° to 3300° F. for at least an hour. In initially starting up the furnace it may be found that the resistance of the unheated wood charcoal is so high as to prevent the passage of sufficient current for heating purposes. Thus the present invention contemplates mixing a certain amount of graphite or other conductive material in the charcoal to assist in the initial heating thereof. However, after the charcoal has become activated and heated it will itself conduct the current so that no graphite or the like need be added once the operation is underway.

There appears to be a definite relation between the treating area and the volume of the individual charcoal particles employed. This relation may be stated generally as follows: The area of the treating space should vary generally as the square of the volume of the charcoal particles. It has been found that this relation insures the production of highly activated charcoal in which the original cell structure of the wood is retained. The other variables are controlled and related as described above so that a uniform, highly activated charcoal is obtained.

After the activating operation the charcoal may be ground if necessary to any desired degree of fineness in order that it be best suited for the particular function that it is to perform.

By the process described herein a superior activated hard wood charcoal is obtained in which the percentage of ash, choride, iron, arsenic, glycerine soluble and included volatiles is very low. The charcoal is light, porous, crystalline and sparkly in appearance and has an electric resistance of about 70 ohms to the cubic inch. The charcoal has an iodine absorption factor of over 60% and a phenol absorption factor of approximately 30 per million (see applicant's copending case Serial No. 683,380, referred to above). The activated charcoal produced by the present process has an apparent density of over .5 and an ash content in the unwashed state of under 7%.

From the foregoing it will be apparent that the present invention has provided a commercially practicable method of producing highly activated wood charcoal. The method comprises a continuous commercial operation which is easily controlled at all times and which can be performed by compartively simple apparatus which functions inexpensively to continuously produce a uniformly high standard of activated charcoal. The various parts of the process are carefully co-related in order to provide an activating operation which produces results other than that heretofore obtained, namely, the production of highly activated wood charcoal possessing new and distinct characteristics.

In accordance with the patent statutes the invention has been specifically described, however, it will be understood that the scope of the invention is not limited thereby but is defined by the appended claims.

What I claim is:

1. The method of making activated wood charcoal which comprises carbonizing wood at temperatures below 1000° F. to form charcoal, granulating and grading the charcoal so that it will pass thru about 4 to 6 mesh screen, removing the dust from the charcoal granules, passing the charcoal granules between electrodes in a substantially air tight chamber, passing electric current thru the charcoal between the electrodes to resistance heat the charcoal, admitting steam near the discharge end of the chamber to pass thru the charcoal while the latter is being heated by the electric current and finally grinding the thus activated charcoal to the desired size, the initial size of the charcoal granules being so correlated with the size of the space between electrodes that changes in area between electrodes vary directly with the square of the volume of the charcoal granules, and the speed and duration of travel of the charcoal, the current employed and the amount of steam used being so correlated so as to result in the charcoal attaining while in the proper state for activation a temperature of between 3000° F. and 3300° for at least one hour.

2. The method of making activated wood charcoal which comprises carbonizing wood at temperature below 1000° F. to form charcoal, removing the dust from the charcoal, passing the charcoal between electrodes in a substantially air tight chamber, passing electric current thru the charcoal between the electrodes to resistance heat the charcoal, admitting steam near the discharge end of the chamber to pass thru the charcoal while the latter is being heated by the electric current and finally grinding the thus activated charcoal to the desired size, the initial size of the charcoal granules being so correlated with the size of the space between electrodes that changes in area between electrodes vary directly with the square of the volume of the charcoal granules, and the speed and duration of travel of the charcoal, the current employed and the amount of steam used being so correlated so as to result in the charcoal attaining while in the proper state for activation a temperature of between 3000° F. and 3300° for at least one hour.

3. The method of making activated wood charcoal which comprises granulating and grading the charcoal, removing the dust from the charcoal granules, passing the charcoal granules between electrodes in a substantially air tight chamber, passing electric current thru the charcoal between the electrodes to resistance heat the charcoal, admitting steam near the discharge end of the chamber to pass thru the charcoal while the latter is being heated by the electric current, the size of the charcoal granules being so correlated with the size of the space between electrodes that changes in area between electrodes vary directly with the square of the volume of the charcoal granules, and the speed and duration of travel of the charcoal, the current employed being automatically controlled to result in the charcoal attaining while in the proper state for activation a temperature of between 3000° F. and 3300° F. for at least one hour.

4. The method of making activated wood charcoal which comprises carbonizing wood at temperatures below 1000° F. to form charcoal, granulating and grading the charcoal so that it will pass thru about 4 to 6 mesh screen, removing the dust from the charcoal granules, passing the charcoal granules between electrodes in a substantially air tight chamber, passing electric current thru the charcoal between the electrodes to resistance heat the charcoal, admitting steam near the discharge end of the chamber to pass thru the charcoal while the latter is being heated by the electric current and finally grinding the thus activated charcoal to the desired size, the initial size of the charcoal granules being so correlated with the size of the space between electrodes that changes in area between electrodes vary directly with the square of the volume of the charcoal granules.

5. The method of making activated wood charcoal which comprises carbonizing wood at temperatures below 1000° F. to form charcoal, granulating and grading the charcoal so that it will pass thru about 4 to 6 mesh screen, removing the dust from the charcoal granules, passing the charcoal granules between electrodes in a substantially air tight chamber, passing electric current thru the charcoal between the electrodes to resistance heat the charcoal, admitting steam near the discharge end of the chamber to pass thru the charcoal while the latter is being heated by the electric current and finally grinding the thus activated charcoal to the desired size.

6. The method of making activated wood charcoal which comprises granulating and grading the charcoal, removing the dust from the charcoal granules, passing the charcoal granules between electrodes in a substantially air tight chamber, passing electric current thru the charcoal between the electrodes to resistance heat the charcoal, admitting steam near the discharge end of the chamber to pass thru the charcoal while the latter is being heated by the electric current, the speed and duration of travel of the charcoal, the current employed being automatically controlled so as to result in the charcoal attaining while in the proper state for activation a temperature of between 3000° F. and 3300° F. for at least one hour.

7. The method of making activated wood charcoal which comprises carbonizing wood at temperatures below 1000° F. to form charcoal, granulating and grading the charcoal so that it will pass thru about 4 to 6 mesh screen, removing the dust from the charcoal granules, passing the charcoal granules between electrodes in a substantially air tight chamber, passing electric current thru the charcoal between the electrodes to resistance heat the charcoal, the size of the charcoal granules being so correlated with the size of the space between electrodes that changes in area between electrodes vary directly with the square of the volume of the charcoal granules, the speed and duration of travel of the charcoal, and the current employed being so correlated so as to result in the charcoal attaining while in the proper state for activation a temperature of between 3000° F. and 3300° F. for at least one hour.

8. That method of making activated charcoal by a one stage treating process which includes the steps of substantially continuously passing dust-free, hard wood charcoal in a column thru an electric furnace between elongated parallel electrodes, passing current across an elongated portion of the column of charcoal between the electrodes whereby the charcoal is resistance heated, subjecting the charcoal during the heating operation to the action of steam which is introduced near the discharge end of the furnace and flows thru the charcoal in a direction opposite to the movement thereof thru the furnace, and relating the electric wattage, the size of the carbon particles, the area and length of the treating furnace, the speed of travel of the charcoal thru the furnace and the amount of steam introduced so that the charcoal will attain activating temperatures in the neighborhood of 3000° F. for a time sufficient to drive substantially all volatiles from the charcoal.

9. That method of making activated charcoal by a one stage treating process which includes the steps of passing granular, dust free, hard wood charcoal in a colume thru an electric furnace between substantially parallel electrodes, passing high current thru the charcoal between the electrodes whereby the charcoal is resistance heated to between about 3000° F. and 3300° F., and subsubjecting the charcoal during the heating operation to the action of steam which is introduced near the discharge end of the furnace and flows thru the charcoal in a direction opposite to the movement thereof thru the furnace.

10. That method of making activated carbon by a one stage treating process which includes the steps of passing substantially dust free carbon thru an electric furnace in a column, passing high electrical current across an elongated portion of the column whereby substantially every granule of the carbon is resistance heated to between about 3000° F. and about 3300° F., and subjecting the carbon during the heating operation to the action of steam.

11. The process of producing highly activated wood charcoal in which the original cellular structure of the wood is retained and which possesses a crystalline and sparkly appearance, which comprises continuously passing wood charcoal between electrodes, to resistance heat the charcoal, the area and length of the treating space and the speed at which the charcoal is moved thru the furnace being so correlated that about 500# of charcoal can be treated in 24 hours with the rate of feed thru the furnace varying from ½" to 5" per hour, introducing approximately 1# to 2# of steam per hour into the charcoal during the treating operation and regulating the electric current with the other factors so that the charcoal is heated to temperatures as high as 3000° F. for at least an hour.

12. The method of manufacturing activated charcoal which comprises carbonizing selected hard wood at temperatures below 1000° F., granulating the charcoal and freeing it from dust, feeding the granular charcoal in a column continuously between elongated electrodes, passing high electric current in a wide elongated path across the column of charcoal so that each granule of charcoal will be subject to resistance heating for at least several hours, subjecting the charcoal to the action of steam during the resistance heating thereof, and continuously removing the charcoal

EDGAR T. OLSON.